US010884457B2

(12) United States Patent
Hong et al.

(10) Patent No.: US 10,884,457 B2
(45) Date of Patent: Jan. 5, 2021

(54) FOLDABLE DISPLAY AND METHOD FOR MAKING A FOLDABLE DISPLAY

(71) Applicant: MOTOROLA MOBILITY LLC, Chicago, IL (US)

(72) Inventors: Seongchul Hong, Vernon Hills, IL (US); Adrian Manea, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 199 days.

(21) Appl. No.: 15/264,841

(22) Filed: Sep. 14, 2016

(65) Prior Publication Data
US 2018/0074551 A1  Mar. 15, 2018

(51) Int. Cl.
*G06F 1/16* (2006.01)
*B32B 37/12* (2006.01)
*B32B 38/00* (2006.01)

(52) U.S. Cl.
CPC ............ *G06F 1/1641* (2013.01); *B32B 37/12* (2013.01); *B32B 2037/1253* (2013.01); *B32B 2038/0076* (2013.01); *B32B 2307/412* (2013.01); *B32B 2310/0831* (2013.01); *B32B 2457/20* (2013.01); *G06F 1/1652* (2013.01)

(58) Field of Classification Search
CPC .... G06F 1/1641; G06F 1/1616; G06F 1/1681; G06F 1/1652
See application file for complete search history.

(56) References Cited

U.S. PATENT DOCUMENTS

| 5,492,589 | A  | * | 2/1996  | Mizuno | B32B 27/08 |
| | | | | | 156/280 |
| 9,287,329 | B1 | * | 3/2016  | Lee | H01L 51/0097 |
| 2014/0295150 | A1 | * | 10/2014 | Bower | C09J 5/00 |
| | | | | | 428/201 |
| 2015/0049428 | A1 | * | 2/2015  | Lee | G06F 1/1652 |
| | | | | | 361/679.27 |
| 2015/0086763 | A1 | * | 3/2015  | Nam | H01L 51/524 |
| | | | | | 428/212 |
| 2015/0207102 | A1 | * | 7/2015  | Jeong | H04M 1/0268 |
| | | | | | 257/40 |
| 2015/0266272 | A1 | * | 9/2015  | Lee | B32B 17/064 |
| | | | | | 428/189 |
| 2015/0268697 | A1 | * | 9/2015  | Nam | G06F 1/1652 |
| | | | | | 428/157 |
| 2015/0382446 | A1 | * | 12/2015 | Kwon | H05K 1/028 |
| | | | | | 174/251 |
| 2016/0111678 | A1 | * | 4/2016  | Lee | C09J 7/00 |
| | | | | | 257/40 |

(Continued)

*Primary Examiner* — James Wu
*Assistant Examiner* — Christopher L Augustin
(74) *Attorney, Agent, or Firm* — Yudell Isidore PLLC (57) ABSTRACT

A foldable screen assembly includes a planar electronic display that has substantially parallel and opposed first and second surfaces. A planar lens assembly has a third surface that is positioned adjacent to the first surface. A first optically clear adhesive extends between the first surface of the electronic display and the third surface of the planar lens assembly. A first area of the first optically clear adhesive is selectively cured to have a first modulus and a second area of the first optically clear adhesive is selectively cured to have a second modulus. The selectively cured first and second areas allow the foldable screen assembly to bend.

11 Claims, 10 Drawing Sheets

(56) References Cited

U.S. PATENT DOCUMENTS

| | | | |
|---|---|---|---|
| 2016/0271914 A1* | 9/2016 | Xie | B32B 27/302 |
| 2016/0303843 A1* | 10/2016 | Jang | B32B 37/0084 |
| 2017/0023715 A1* | 1/2017 | Kim | G02B 5/3016 |
| 2017/0157420 A1* | 6/2017 | Smedinga | G02B 6/0036 |
| 2017/0294495 A1* | 10/2017 | Shyu | G06F 3/041 |
| 2017/0321087 A1* | 11/2017 | Moon | C09J 4/00 |
| 2018/0118982 A1* | 5/2018 | Campbell | C09J 9/00 |

* cited by examiner

FOLDABLE DISPLAY AND METHOD FOR MAKING A FOLDABLE DISPLAY

BACKGROUND

1. Technical Field

The present disclosure generally relates to electronic devices. More specifically, the present disclosure relates to a foldable display and a method of making a foldable display.

2. Description of the Related Art

Electronic devices such as computers and mobile phones are extremely popular and enjoy wide spread acceptance in our society. Electronic devices use various types of displays to show visual information to a user. It is desirable, in some applications, for the display to bend or fold in order to provide a more compact form factor in a folded configuration. One problem that foldable displays can experience is that visual defects can occur in the bendable area due to de-lamination and buckling of various layers in the display.

BRIEF DESCRIPTION OF THE DRAWINGS

The description of the illustrative embodiments is to be read in conjunction with the accompanying drawings, wherein.

DETAILED DESCRIPTION

The illustrative embodiments provide a foldable screen assembly and a method of manufacturing a foldable screen assembly. The foldable screen assembly includes a planar electronic display that has substantially parallel and opposed first and second surfaces. A planar lens assembly has a third surface that is positioned adjacent to the first surface. A first optically clear adhesive extends between the first surface of the electronic display and the third surface of the planar lens assembly. A first area of the first optically clear adhesive is selectively cured to have a first modulus and a second area of the first optically clear adhesive is selectively cured to have a second modulus. The selectively cured first and second areas allow the foldable screen assembly to bend.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that term is utilized.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments. In the illustration of the various embodiments, two different figures can be provided that have overlaps and/or similarities in the components within the two figures. In such instances, the descriptions of these figures can be presented together to avoid repetition. Components that are not intended to be different from one illustration to the other are provided the same reference numerals within the figures, to simplify the descriptions of the figures. In the description of each of the following figures, reference is also made to elements described in one or more preceding figures.

The below described figures present aspects of the above introduced foldable screen assembly 115. Those of ordinary skill in the art will appreciate that the hardware components and basic configuration depicted in FIGS. 1-7 may vary. Specifically, the illustrative components within foldable screen assembly 115 are not intended to be exhaustive, but rather are representative to highlight essential components that can be utilized to implement aspects of the present disclosure. For example, other devices/components may be used in addition to or in place of the hardware depicted. The depicted example is not meant to imply architectural or other limitations with respect to the presently described embodiments and/or the general concepts presented by the disclosure. As a general extension of the disclosure, the aspects described herein as being implemented within or involving a mobile electronic device, illustrated as a mobile phone, are understood to be only a specific example or representation of a mobile electronic device. The described functionality is particularly applicable to a computer system, including a desktop, laptop, tablet, or other type of computing device and may not necessarily be a mobile electronic device.

Figure 1A:
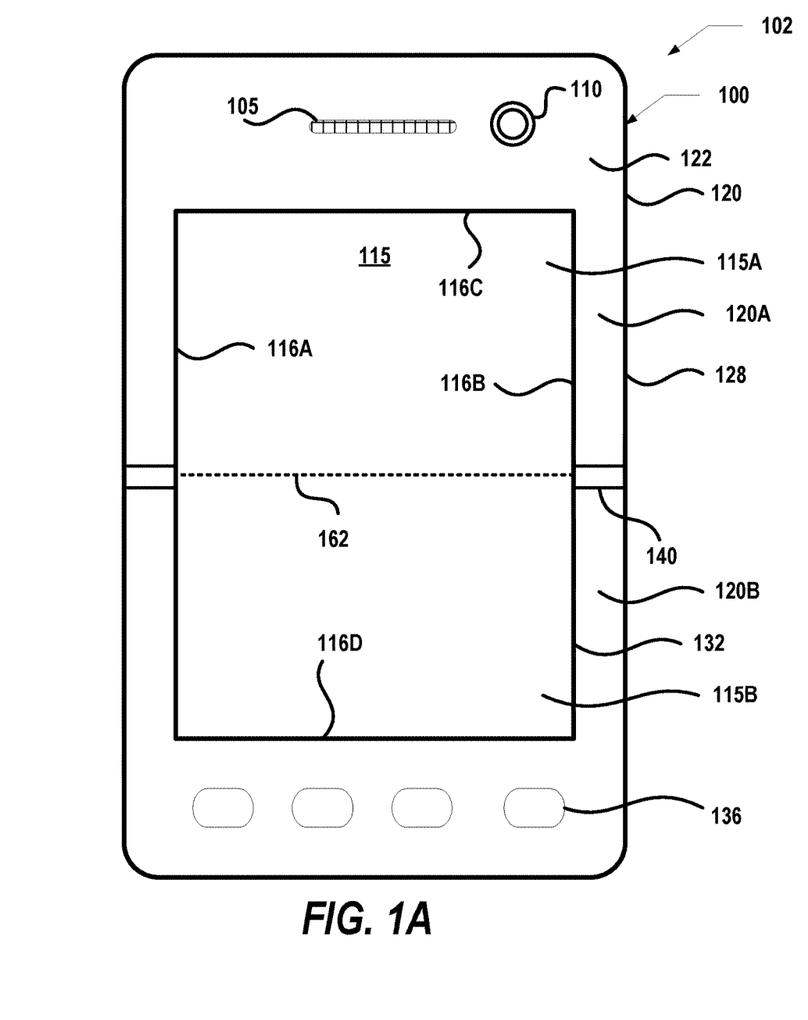
FIG. 1A illustrates a diagrammatic representation of an example foldable electronic device in an unfolded configuration, according to one embodiment.

With reference now to the figures, and beginning with FIG. 1A, there is depicted a foldable electronic device 100 in an open or unfolded configuration 102. For purposes of the description of illustrative embodiments, foldable electronic device 100 can be a mobile electronic device. For example, foldable electronic device 100 can be one of a wide variety of digital/electronic devices that can communicate via wireless transmission over a wireless network, including devices such as a mobile phone, smartphone, personal digital assistant, tablet computer, or other digital device. Foldable electronic device 100 includes a housing 120 having an upper half or upper portion 120A, a lower half or lower portion 120B, a front surface 122, a rear surface 124 (FIG. 1B), side surfaces 126 (FIG. 1B) and outer peripheral edges 128. Foldable electronic device 100 is generally shown having a speaker 105, image capture device 110, such as a camera, and a foldable screen assembly 115. Foldable screen assembly 115 can display user viewable content generated and/or received by foldable electronic device 100. A recess or opening 132 is defined in the front surface 122 of housing 120 to receive foldable screen assembly 115. In one embodiment, foldable screen assembly 115 can occupy the entire front surface 122 such that the foldable screen assembly 115 extends entirely to edges 128.

Figure 1B:
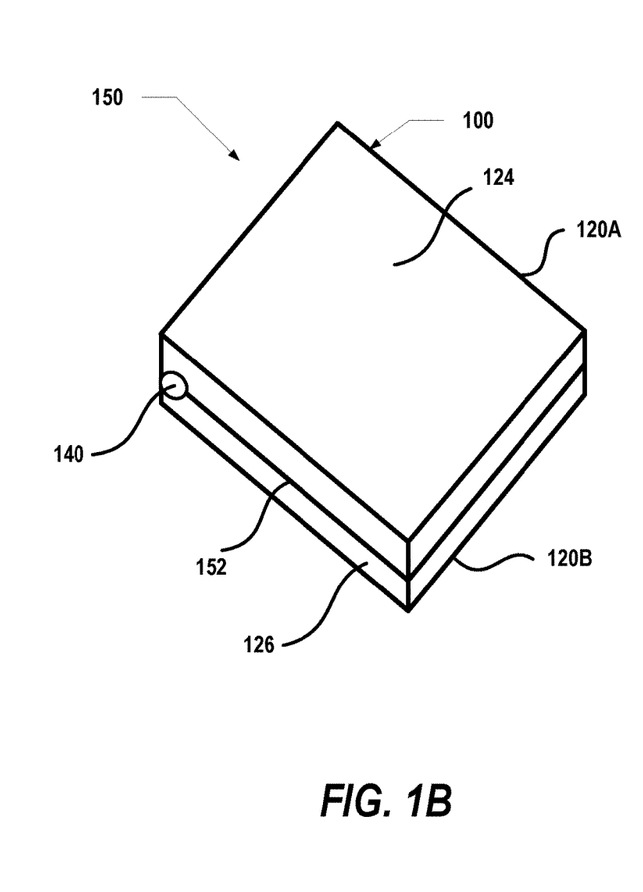
FIG. 1B illustrates a diagrammatic representation of an example foldable electronic device in a folded configuration, according to one embodiment.

Foldable electronic device 100 can also include physical or virtual buttons 136 that allow user input to be provided to foldable electronic device 100. A hinge or flexible member 140 is coupled to housing 120. Flexible member 140 allows the upper portion 120A and lower portion 120B to bend or rotate relative to each other. A fold area or line 162 is defined in foldable screen assembly 115. Foldable screen assembly 115 can bend about fold line 162 such that foldable screen assembly 115 has an upper half 115A and a lower half 115B. Foldable screen assembly 115 further includes four outer peripheral edges 116A, 116B, 116C and 116D. With reference to FIG. 1B, foldable electronic device 100 is shown in a closed or folded configuration 150. Upper portion 120A and lower portion 120B have been bent about flexible member 140, and foldable screen assembly 115 has been folded into folded configuration 150. In folded configuration 150, a seam 152 is defined between upper portion 120A and lower portion 120B. It is appreciated that housing 120 and foldable screen assembly 115 can have different shapes for other embodiments/implementations of foldable electronic device 100.

Figure 2:
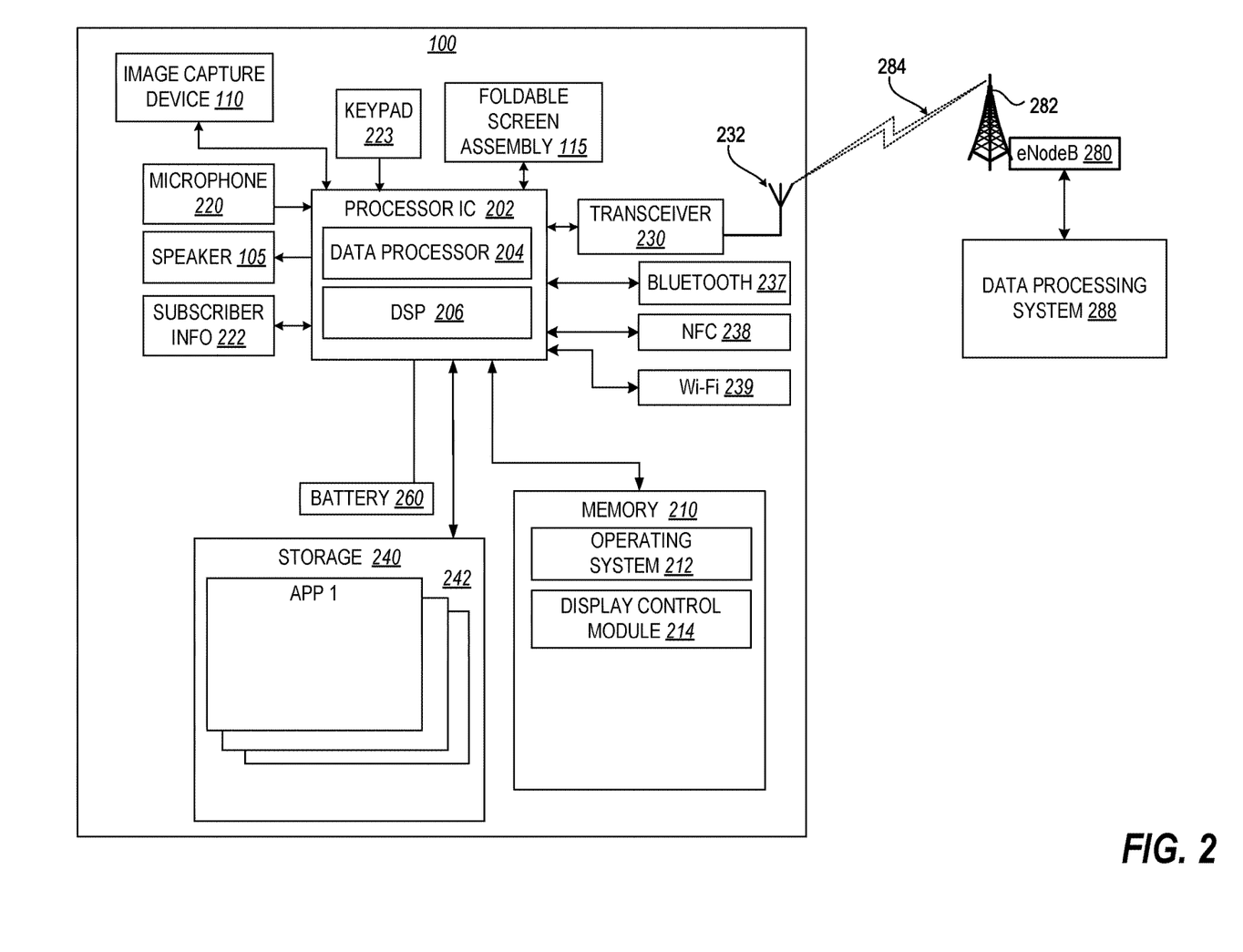
FIG. 2 illustrates a block diagram representation of a mobile communication device as an example foldable electronic device with wireless connections to external networks and devices, according to one embodiment.

FIG. 2 illustrates an example foldable electronic device 100 configured as a wireless communication device, such as a mobile phone, with wireless connection capability that enable foldable electronic device 100 to communicatively connect to external wireless networks, such as wireless network with evolved Node B (eNodeB) 280, and to remote devices. Foldable electronic device 100 includes processor integrated circuit (IC) 202, which includes data processor 204 and digital signal processor 206. Processor IC 202 is communicatively coupled to memory 210 and storage 240 via a communication bus or direct connection. Memory 210 is a non-transitory computer readable storage medium/device that stores data and software programs and/or code that can be executed on processor IC 202. In one embodiment, memory 210 is a non-volatile memory. Memory 210 can contain operating system 212 and display control module 214.

Operating system 212 manages the hardware resources of foldable electronic device 100 and provides common services for software applications. Display control module 214 executes on processor IC 202 to control the operation of foldable screen assembly 115. Storage 240 is a computer readable storage medium/device that stores data and software programs and/or code that can be executed on processor IC 202. In one embodiment, storage 240 is a non-volatile memory. Storage 240 includes one or more software applications (APP) 242, an example of which is shown as APP 1. Software applications 242 execute on processor IC 202 to perform various functional processes.

Foldable electronic device 100 further comprises image capture device 110, microphone 220, speaker 105, keypad 223, and foldable screen assembly 115, all of which are connected to processor IC 202. Foldable electronic device 100 accepts user input using microphone 220 and keypad 223. Foldable electronic device 100 can also accept user input via foldable screen assembly 115, when foldable screen assembly 115 is configured as and/or provides a touch screen display. Foldable electronic device 100 provides audio output to a user via speaker 105 and visual output via the display provided by functional foldable screen assembly 115. Subscriber information module 222 is communicatively coupled to processor IC 202. Subscriber information module 222 can be a removable memory module that contains encrypted access data that allows foldable electronic device 100 to access a wireless network via eNodeB 280. Foldable electronic device 100 also has Bluetooth transceiver 237, near field communication transceiver (NFC) 238, and a Wi-Fi transceiver 239. Bluetooth transceiver 237, NFC transceiver 238, and Wi-Fi transceiver 239 are in communication with processor IC 202, and each of Bluetooth transceiver 237, NFC transceiver 238, and Wi-Fi transceiver 239 allow for foldable electronic device 100 to communicate with similarly equipped external devices.

Foldable electronic device 100 further includes a transceiver 230 that is communicatively coupled to processor IC 202 and to antenna 232. Transceiver 230 allows for wide-area or local wireless communication between foldable electronic device 100 and eNodeB 280 via wireless signal 284. Foldable electronic device 100 can be communicatively coupled to and in communication with a second remotely located device, such as data processing system (DPS) 288, via a communication path involving transceiver 230, antenna 232, wireless signal 284 and eNodeB 280. Foldable electronic device 100 is capable of wide-area or local wireless communication with other mobile wireless devices or with eNodeB 280. DPS 288 can transmit data and software to foldable electronic device 100 and receive data transmitted from foldable electronic device 100 and other mobile devices connected to the wireless network. Foldable electronic device 100 also contains a power source, such as a battery 260, that supplies power to components within foldable electronic device 100.

Figure 3:
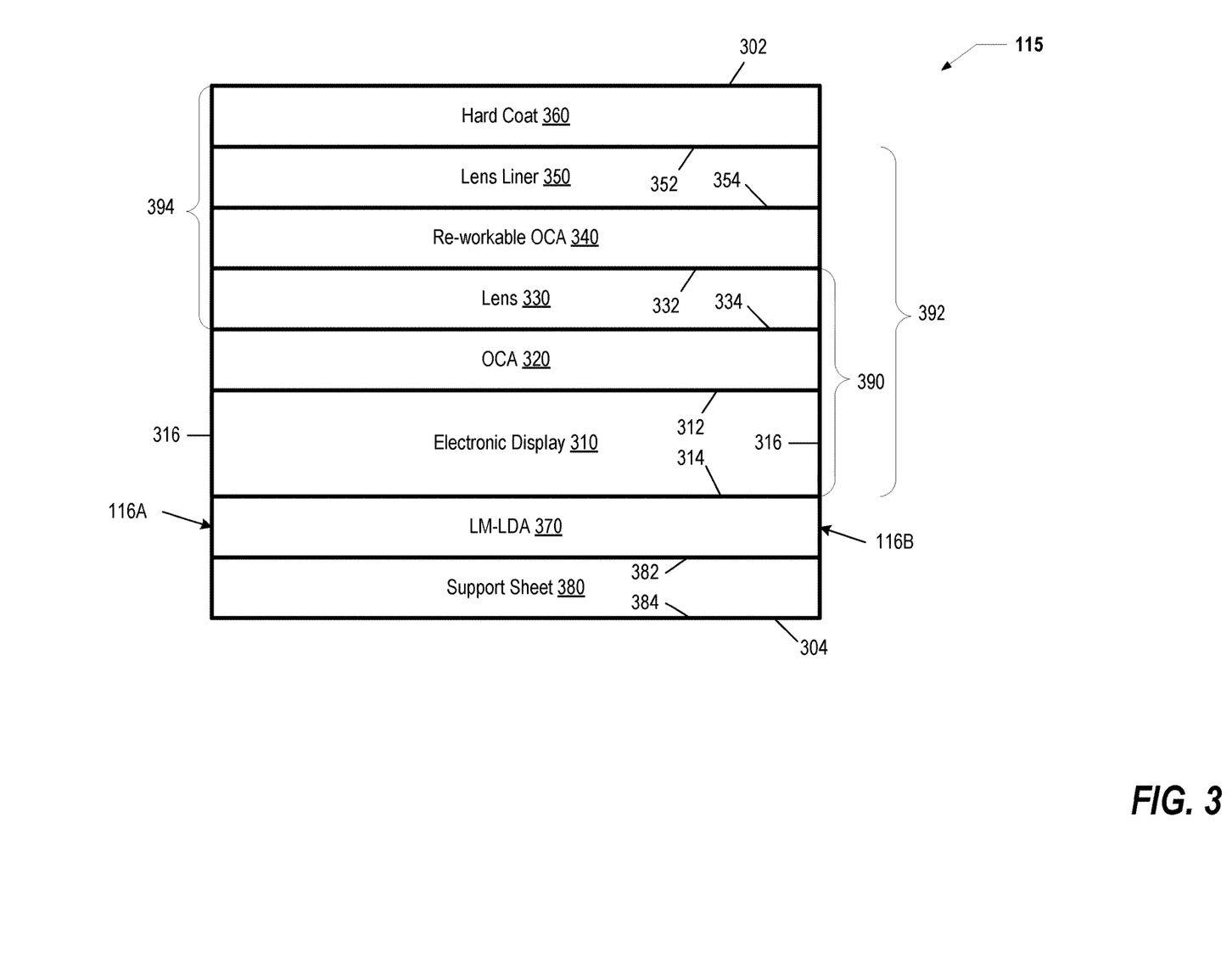
FIG. 3 illustrates a cross-sectional view of a foldable screen assembly, according to one embodiment.

FIG. 3 illustrates further details of foldable screen assembly 115. Foldable screen assembly 115 comprises several layers that are laminated together to form foldable screen assembly 115. Foldable screen assembly 115 has an outer top surface 302, outer bottom surface 304 and edges 116A and 116B. Foldable screen assembly 115 includes an electronic display 310 that is generally planar in shape and has substantially parallel and opposed top 312 and bottom 314 surfaces. According to one aspect of the disclosure, at least one portion of electronic display 310 is flexible or bendable. In one embodiment, electronic display 310 can be a bendable touch sensitive display that can accept user input. In another embodiment, electronic display 310 can be a bendable organic light emitting display (OLED). An optically clear adhesive (OCA) or OCA layer 320 is deposited on and attached or bonded to top surface 312. OCA is a liquid-based bonding technology commercially used in display devices to bind various components together. OCA improves optical characteristics and durability. In one embodiment, OCA 320 is a UV curable adhesive, presenting specific curing qualities, where the amount of curing is proportional to the intensity and length of time that the OCA is exposed to UV light.

Foldable screen assembly 115 also includes lens 330. Lens 330 is generally planar in shape and has substantially parallel and opposed top 332 and bottom 334 surfaces. Lens 330 can reduce reflections and improve the optical transmission of light generated by electronic display 310. Lens 330 can be formed from optically transparent flexible materials including various polymers, such as polycarbonates. In one embodiment, lens 330 can include a polarizer that is an optical filter that lets light of a specific polarization pass and blocks waves of other polarizations. Bottom surface 334 is attached or bonded to OCA 320. Thus, OCA 320 is located between electronic display 310 and lens 330. OCA 320 holds or bonds electronic display 310 and lens 330 together.

As further shown, an additional re-workable OCA 340 is deposited on and attached or bonded to the top surface 332 of lens 330. The disclosure makes use of the fact that re-workable OCA 340 is an adhesive that can be re-worked. Re-worked means that the layers being bonded together by re-workable OCA 340 can be separated after they are contacted, but before UV curing. Foldable screen assembly 115 also includes lens liner 350. Lens liner 350 is generally planar in shape and has substantially parallel and opposed liner top surface 352 and bottom liner surface 354. The bottom liner surface 354 of the lens liner 350 is attached or bonded to re-workable OCA 340. Thus, re-workable OCA 340 is located between lens 330 and lens liner 350. Re-workable OCA 340 holds or bonds lens 330 and lens liner 350 together. A scratch resistant layer, hard coating 360, covers liner top surface 352 of the lens liner. Hard coating 360 prevents damage to lens liner 350. In one embodiment, hard coating 360 is a UV curable material.

As further illustrated, low modulus low density adhesive (LM-LDA) 370 is deposited on and attached or bonded to bottom surface 314 of electronic display 310. LM-LDA 370 is an adhesive that cures without UV light. Foldable screen assembly 115 further includes support sheet 380, which is generally planar in shape and has substantially parallel and opposed top support sheet surface 382 and bottom support sheet surface 384. In one embodiment, support sheet 380 can be formed from a metal or plastic material. Top support sheet surface 382 of support sheet 380 is attached or bonded to LM-LDA 370. Structurally, LM-LDA 370 is located between electronic display 310 and support sheet 380. LM-LDA 370 holds or bonds electronic display 310 and support sheet 380 together. The combination of electronic display 310, OCA 320, and lens 330 forms sub-assembly 390. The combination of electronic display 310, OCA 320, lens 330, re-workable OCA 340, and lens liner 350 forms another or second sub-assembly 392. The combination of lens 330, re-workable OCA 340, lens liner 350, and hard coat 360 forms lens assembly 394.

Figure 4A:
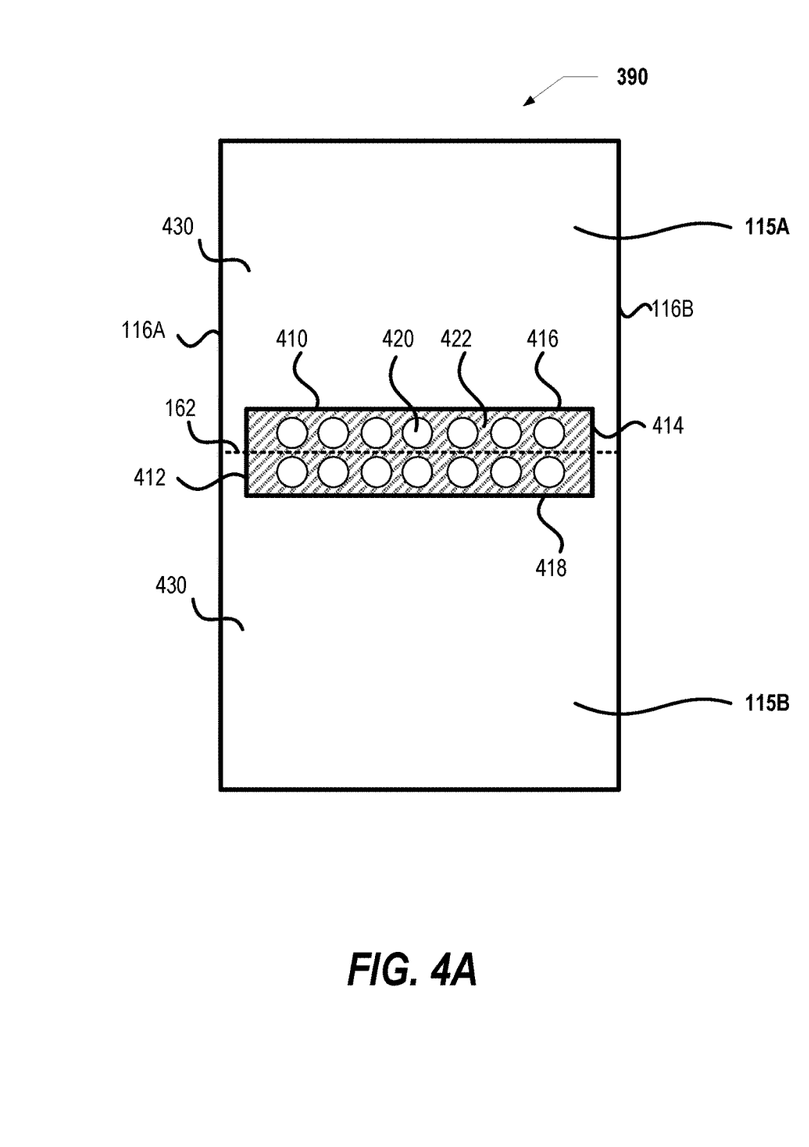
FIG. 4A illustrates one example of a top view of the optically clear adhesive (OCA) layer of the foldable screen assembly, according to one embodiment.

FIG. 4A illustrates a top view of sub-assembly 390. As viewed through lens 330, OCA 320 includes pattern region 410 of at least partially cured areas 420 and at least partially uncured areas 422. Pattern region 410 is defined by opposed sides 412 and 414, top side 416 and bottom side 418. The cured areas are cured by an applied UV light during manufacturing. Pattern region 410 is located centered about or proximate to fold line 162. In one embodiment, cured areas 420 can have a circular shape. Cured areas 420 can include various other shapes with different sizes. In another embodiment, all of the area within pattern region 410 can be "at least partially uncured" area 422. An additional at least partially cured area 430 partially surrounds pattern region 410. In one embodiment, at least partially cured area 430 can extend between side 412 and edge 116A and can extend between side 414 and opposite edge 116B. At least partially uncured area 422 allows foldable screen assembly 115 to bend or fold along fold line 162 such that the upper half 115A and lower half 115B rotate or fold along the uncured areas 422.

Figure 4B:
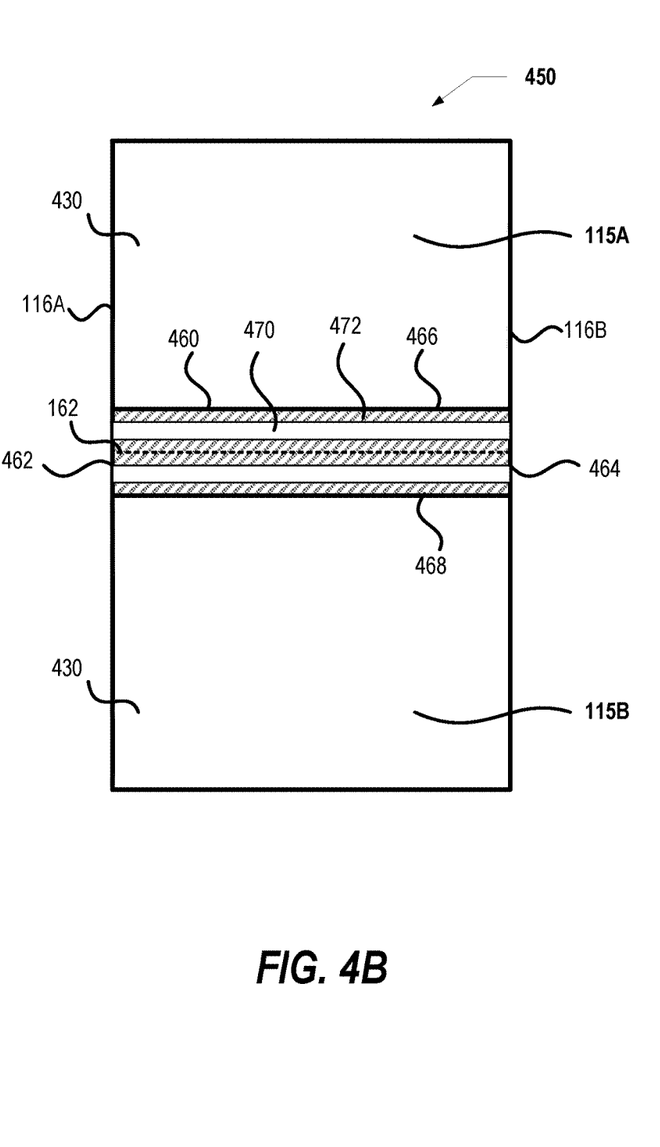
FIG. 4B illustrates another example of a top view of the OCA layer of the foldable screen assembly, according to one embodiment.

Turning to FIG. 4B, there is presented another embodiment of sub-assembly 450. As viewed through lens 330, OCA 320 includes a pattern region 460 of at least partially cured areas 470 and at least partially uncured areas 472. Pattern region 460 is defined by opposed sides 462 and 464, top side 466 and bottom side 468. The cured areas are cured by an applied UV light during manufacturing. Pattern region 460 is located centered about or proximate to fold line 162. In one embodiment, the uncured areas 472 can have a linear shape. Uncured areas 472 can include various other shapes with different sizes. In one embodiment, an additional "at least partially cured" area 430 can partially or completely surround pattern region 460. In one embodiment, the at least partially uncured areas 472 can extend entirely to edges 116A and 116B. The at least partially uncured areas 472 allows the foldable screen assembly 115 to bend or fold along fold line 162 such that the upper half 115A and lower half 115B rotate or fold along the uncured areas 472.

In one embodiment, uncured areas 422 and 472 can have a relatively low modulus, such as less than 50 kilo-pascals, that allows the uncured area to be flexible. Modulus or Young's modulus is a mechanical property of linear elastic solid materials that defines the relationship between stress (force per unit area) and strain (proportional deformation) in a material. Cured areas 420, 470 and 430 can have a modulus greater than 50 kilo-pascals that allow the cured area to be relatively rigid.

Figure 5:
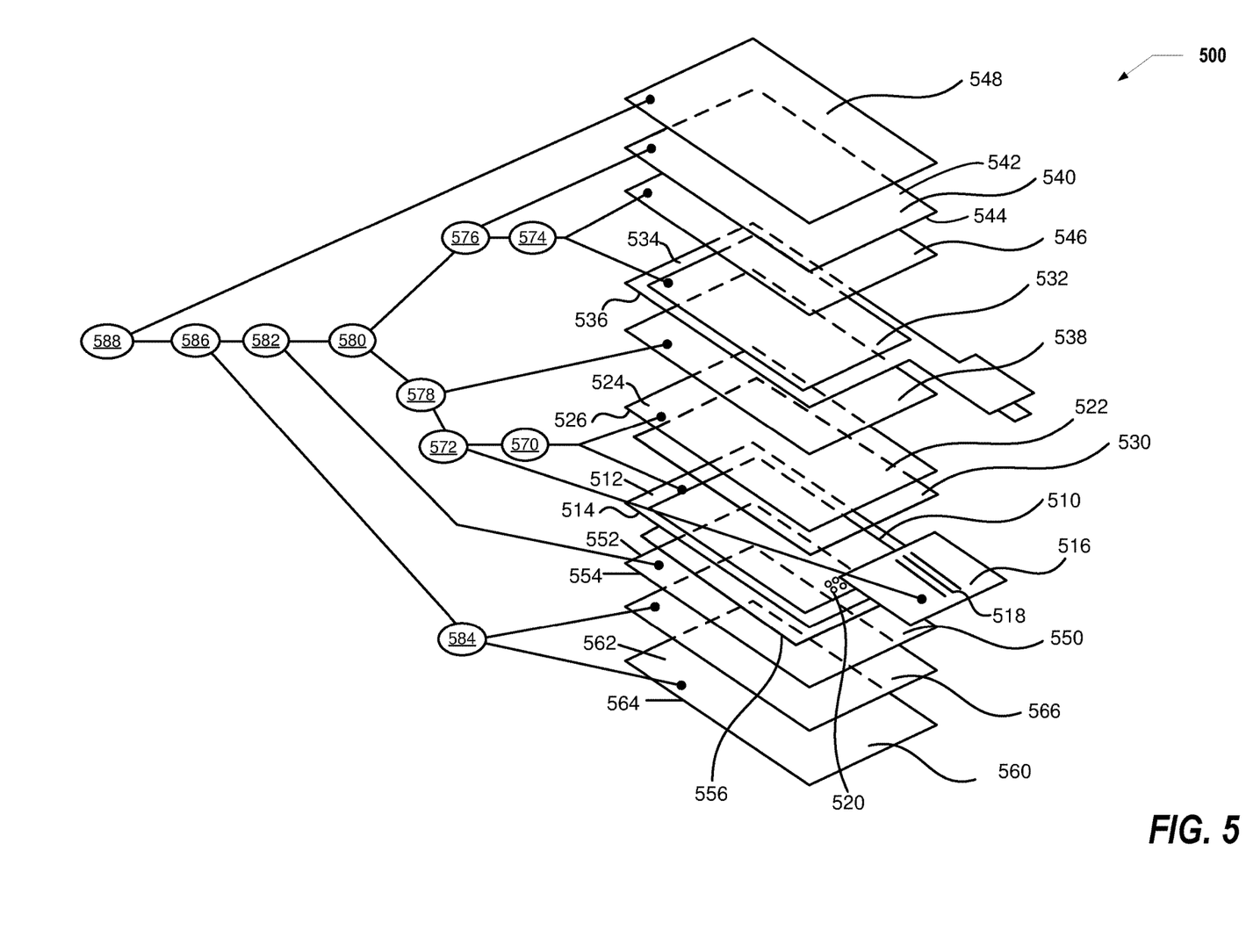
FIG. 5 illustrates an exploded view of a foldable screen assembly, according to one embodiment.

FIG. 5 illustrates details of another embodiment of foldable screen assembly 500. Foldable screen assembly 500 comprises several layers that are laminated together to form foldable screen assembly 500. Foldable screen assembly 500 includes an electronic display 510 that is generally planar in shape and has substantially parallel and opposed top 512 and bottom 514 surfaces. At least a portion of electronic display 510 is flexible or bendable. In an embodiment, electronic display 510 can be a bendable organic light emitting display (OLED). A flexible cable 516 contains circuit lines 518 that are electrically connected to electronic display 510 via conductive adhesive 520.

As further shown, foldable screen assembly 500 includes polarizer 522 that is generally planar in shape and has substantially parallel and opposed top 524 and bottom 526 surfaces. Polarizer 522 can reduce reflections and improve the optical transmission of light generated by electronic display 510. Polarizer 522 can be formed from optically transparent flexible materials including various polymers such as polycarbonates. Bottom surface 526 of the polarizer is attached or bonded to top surface 512 by OCA 530. Thus, OCA 530 is located between electronic display 510 and polarizer 522. OCA 530 holds or bonds electronic display 510 and polarizer 522 together.

As further illustrated, foldable screen assembly 500 includes bendable touch sensor 532 that is generally planar in shape and has substantially parallel and opposed top 534 and bottom 536 surfaces. Touch sensor 532 can accept user input via a user touching top surface 534. Bottom surface 536 of touch sensor 532 is attached or bonded to top surface 524 of polarizer 522 by OCA 538. Thus, OCA 538 is located between touch sensor 532 and polarizer 522. OCA 538 holds or bonds touch sensor 532 and polarizer 522 together.

As further shown, foldable screen assembly 500 includes a bendable window or lens 540 that is generally planar in shape and has substantially parallel and opposed top surface 542 and bottom surface 544. Lens 540 can protect the electronic display from damage and reduce reflections, as well as improve the optical transmission of light generated by the electronic display. The bottom surface 544 of the lens is attached or bonded to the top surface 534 of the touch sensor by OCA 546. Thus, OCA 546 is located between touch sensor 532 and lens 540. OCA 546 holds or bonds touch sensor 532 and lens 540 together. A scratch resistant hard coating 548 covers the top surface 542 of the lens. Hard coating 548 prevents damage to the lens. In one embodiment, hard coating 548 is a UV curable material.

As further depicted, foldable screen assembly 500 includes a cover 550 that is generally planar in shape and has substantially parallel and opposed top surface 552 and bottom surface 554. Cover 550 can protect the electronic display 510 from damage. Bottom surface 514 of the electronic display 510 is attached or bonded to top surface 554 of the cover 550 by OCA 556. Thus, OCA 556 is located between display 510 and cover 550. OCA 556 holds or bonds display 510 and cover 550 together. As further shown, foldable screen assembly 500 includes support plate 560 that is generally planar in shape and has substantially parallel and opposed surfaces, top surface 562 and bottom surface 564. Bottom surface 554 of the cover 550 is attached or bonded to top surface 562 of the support plate 560 by OCA 566. Thus, OCA 566 is located between support plate 560 and cover 550. OCA 566 holds or bonds support plate 560 and cover 550 together. All of the OCA used in foldable screen assembly 500 (i.e. OCA 530, 538, 546, 556 and 566) is UV curable.

Foldable screen assembly 500 can be assembled or manufactured in a series of processes or operations as shown in FIG. 5. At process 570, OCA 530 is deposited onto top surface 512 of the electronic display 510 and bottom surface 526 of the polarizer is mounted onto OCA 530, such that electronic display 510 and polarizer 522 are laminated together. OCA 530 can then be selectively cured using a UV light and a UV mask. At process 572, conductive adhesive 520 is deposited onto top surface 512 of the electronic display 510 in selective locations and the flexible cable 516 is mounted onto the conductive adhesive 520, such that flexible cable 516 is attached to the electronic display 510. Conductive adhesive 520 can be allowed to cure by air drying.

At process 574, OCA 546 is deposited onto top surface 534 of touch sensor 532, and at process 576, bottom surface 544 of lens 540 is mounted onto OCA 546 such that touch sensor 532 and lens 540 are laminated together. The OCA 546 can then be selectively cured using a UV light and a UV mask. At process 578, OCA 538 is deposited onto top surface 524 of polarizer 522, and at process 580, the combination of touch sensor 532 and lens 540 are mounted onto OCA 538. OCA 538 can then be selectively cured using a UV light and a UV mask. At process 582, OCA 556 is deposited onto top surface 552 of cover 550 and is mounted to bottom surface 514 of the electronic display 510. OCA 556 can then be selectively cured using a UV light and a UV mask. OCA 566 is deposited onto the bottom surface 554 of cover 550 (process 584), and top surface 562 of support plate 560 is mounted onto OCA 566 (process 586). OCA 566 can then be selectively cured using a UV light and a UV mask. At process 588, hard coating 548 is deposited onto top surface 542 of lens 540 and cured using UV light.

FIGS. 6A-6D illustrate several embodiments of ultraviolet (UV) photo masks that can be used to manufacture foldable screen assembly 115. UV mask 610 of FIG. 6A has a planar substrate 612 upon which a pattern 614 is formed of light blocking areas 616 and circular light passing areas 618. Pattern 614 corresponds to the same shape as pattern region 410 of FIG. 4A. UV mask 610 with pattern 614 is used to manufacture OCA 320 with pattern region 410. UV mask 630 of FIG. 6B has a planar substrate 632 upon which a slit type pattern 634 is formed of light blocking areas 638 and light passing areas 636. Pattern 634 corresponds to the same shape as pattern region 460 of FIG. 4B. UV mask 630 with pattern 634 is used to process OCA 320 with pattern region 460.

Figure 6A:
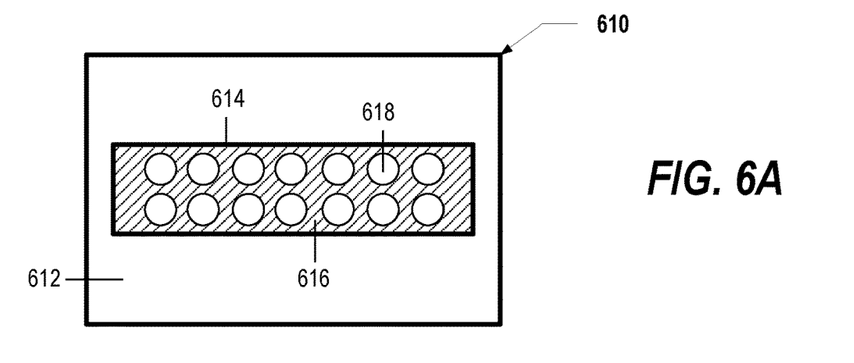
FIGS. 6A, 6B, 6C, and 6D illustrate several different embodiments of ultraviolet (UV) masks.
Figure 6B:
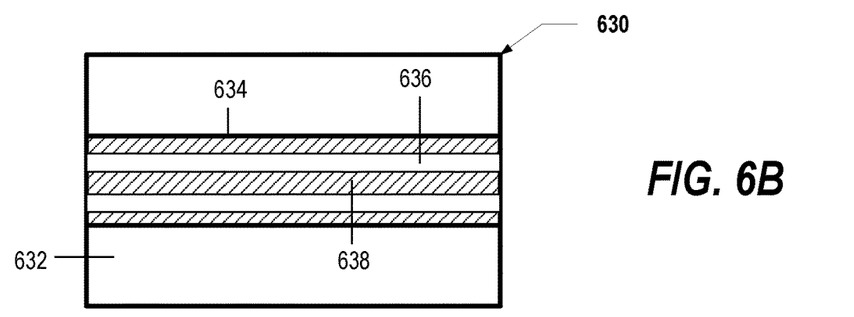
Figure 6C:
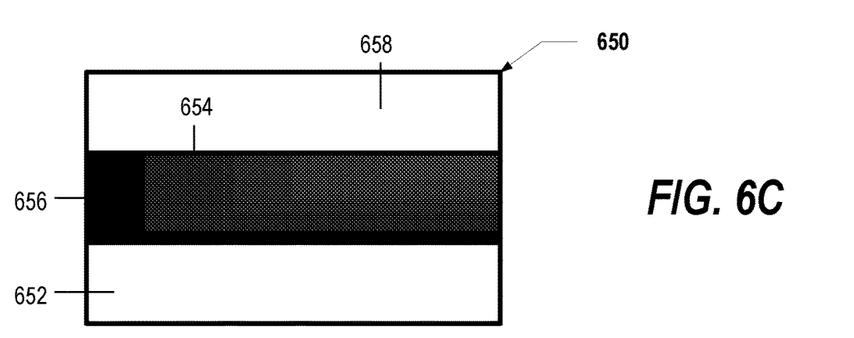
Figure 6D:
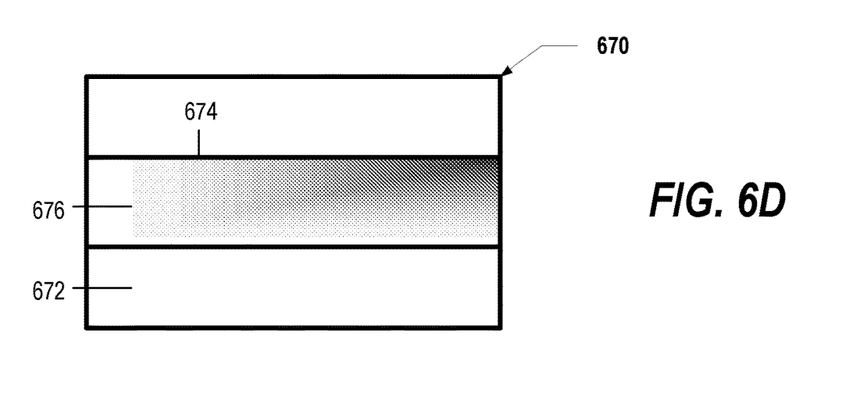

UV mask 650 of FIG. 6C has a planar substrate 652 upon which a full type pattern 654 is formed of light blocking areas 656 and light passing areas 658. OCA 320 processed with pattern 654 produces uncured OCA within the patterned area. UV mask 670 of FIG. 6D has a planar substrate 672 upon which a gradient type pattern 674 is formed. Pattern 674 has a gradient of less light blocking areas 676 on one side and gradually increasing to more light blocking areas 678 on another side. OCA 320 manufactured with pattern 674 has a gradient of areas with cured and uncured OCA. UV masks 610, 630, 650 and 670 can be made from a variety of materials such as metals, glass or polymers and can be patterned using conventional UV photo-mask manufacturing techniques, such screen printing or etching.

Figure 7:
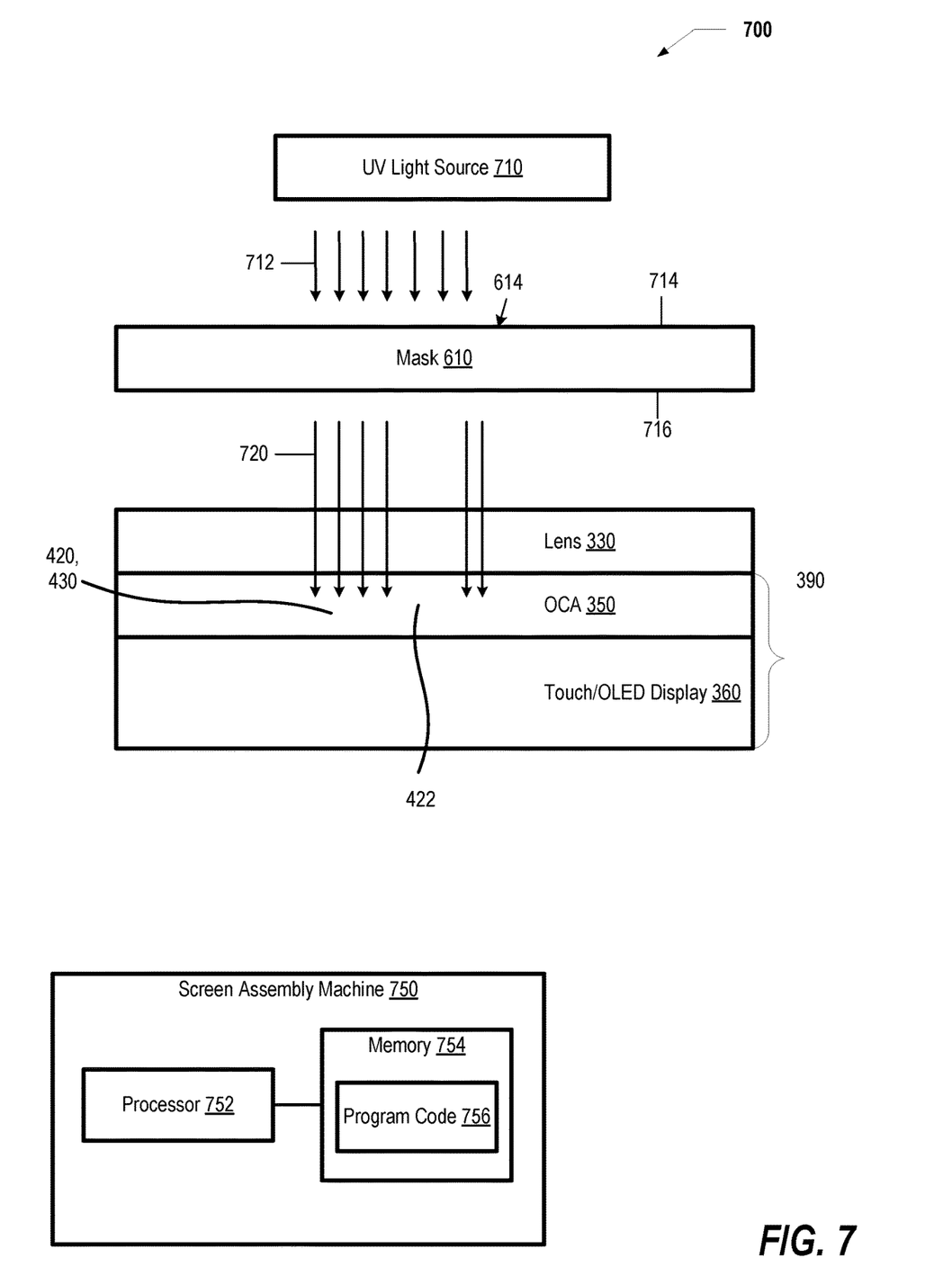
FIG. 7 illustrates a side view of a UV light and UV mask being used to cure the OCA, according to one embodiment.

With reference to FIG. 7, an apparatus 700 that can be utilized to form selectively cured and uncured areas of UV sensitive OCA 320 is illustrated. Apparatus 700 comprises a UV light source 710 that is a source of UV light rays 712. UV light rays 712 generated by UV light source 710 impinge or irradiate a photo mask such as mask 610. Mask 610 has a top surface 714 and a bottom surface 716. UV light source 710 is juxtaposed to top surface 714. After passing through mask 610, attenuated UV light rays 720 that have been attenuated by pattern 614, pass through lens 330 to at least partially cure the at least partially cured areas 420, 430 of OCA 320. The areas of OCA 320 where UV light rays have been blocked by pattern 614 correspond to the at least partially uncured areas 422.

A screen assembly machine 750 can be used to manufacture foldable screen assembly 115. Screen assembly machine 750 includes a processor 752 and memory 754 that stores program code 756. The program code contains instructions and data that can cause screen assembly machine 750 to perform various processes and steps used to manufacture foldable screen assembly 115.

Figure 8A:
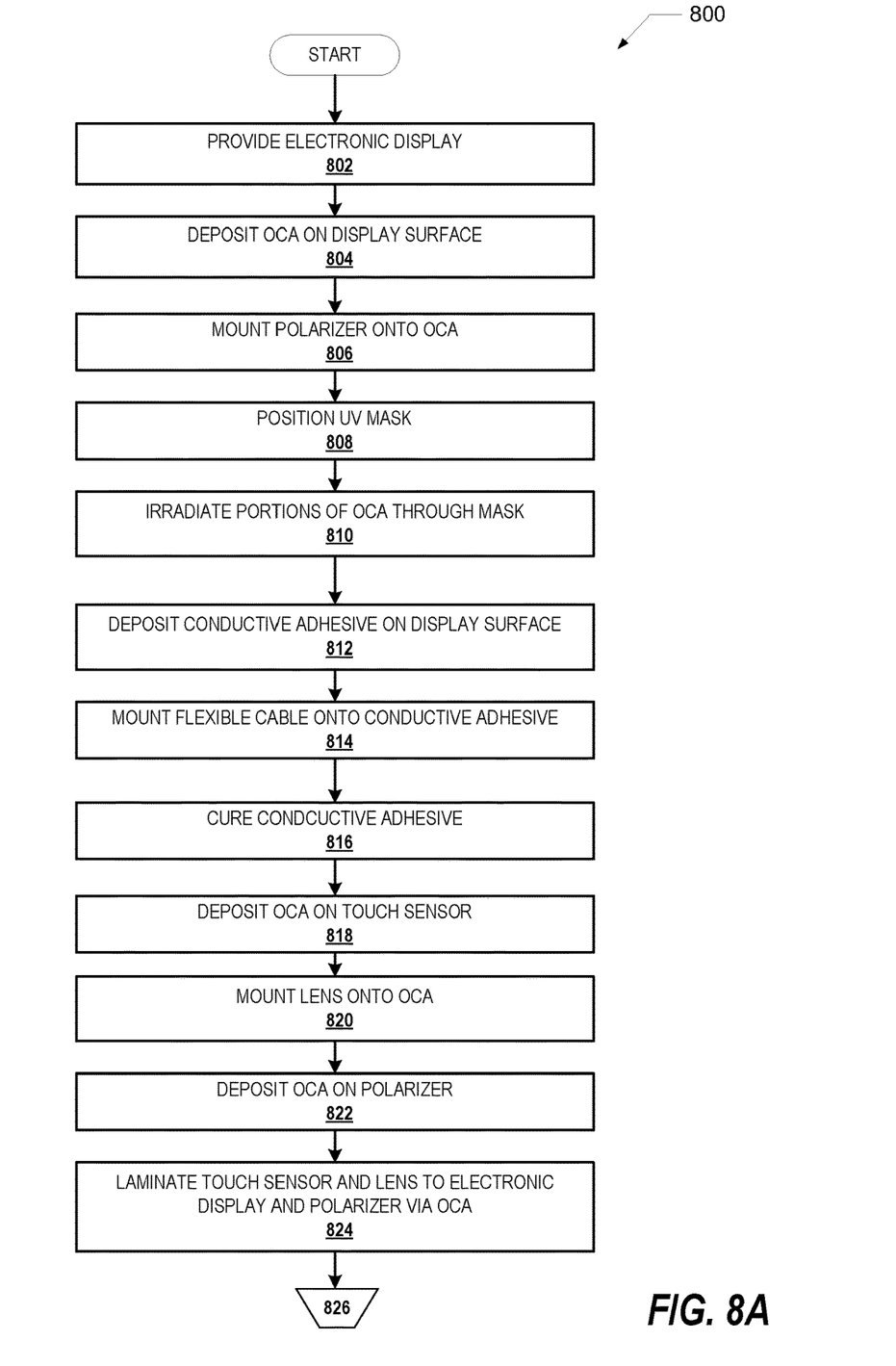
FIG. 8A-8C illustrate a flowchart of a method of manufacturing a foldable screen assembly, according to one embodiment.
Figure 8B:
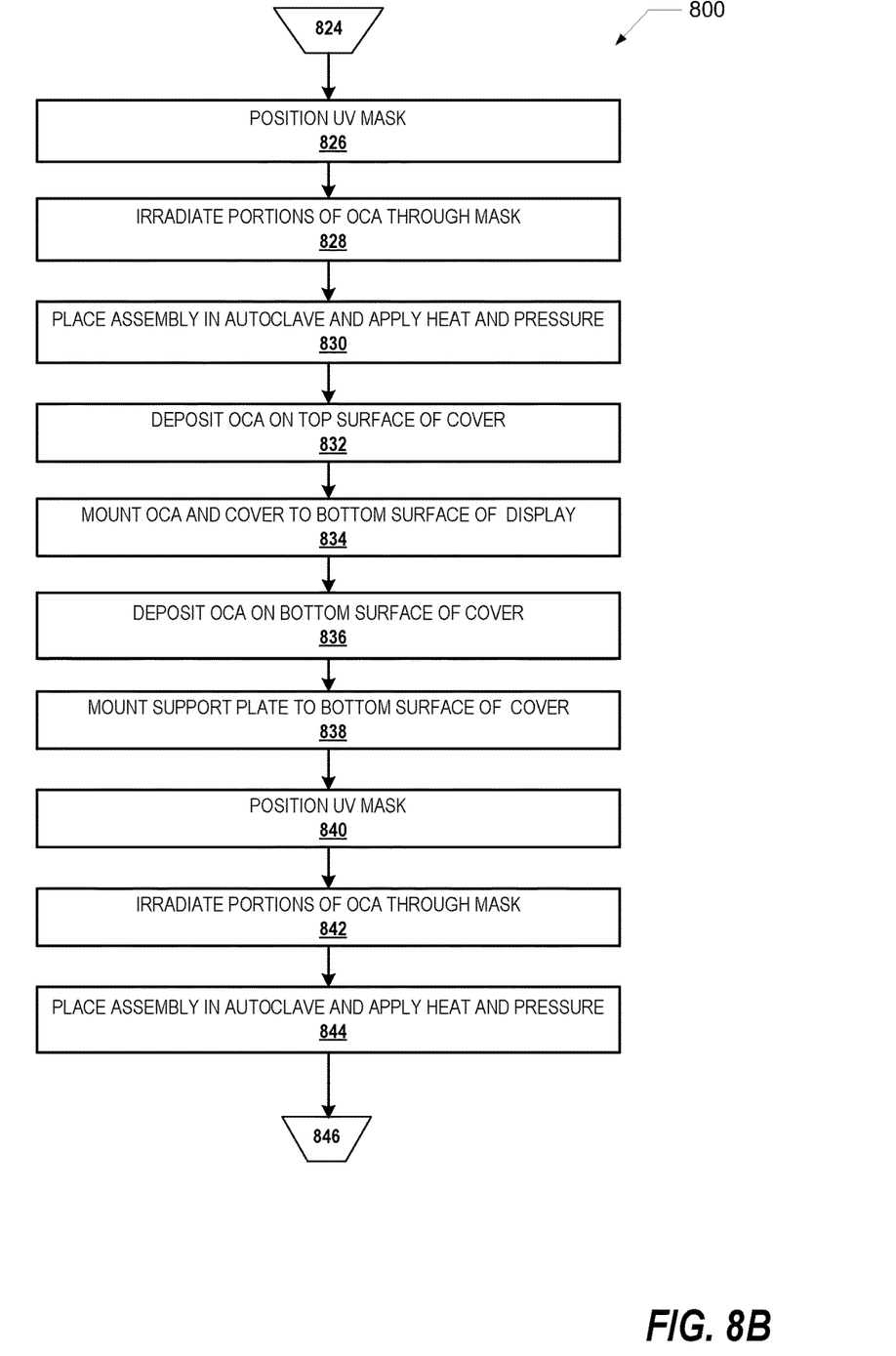
Figure 8C:
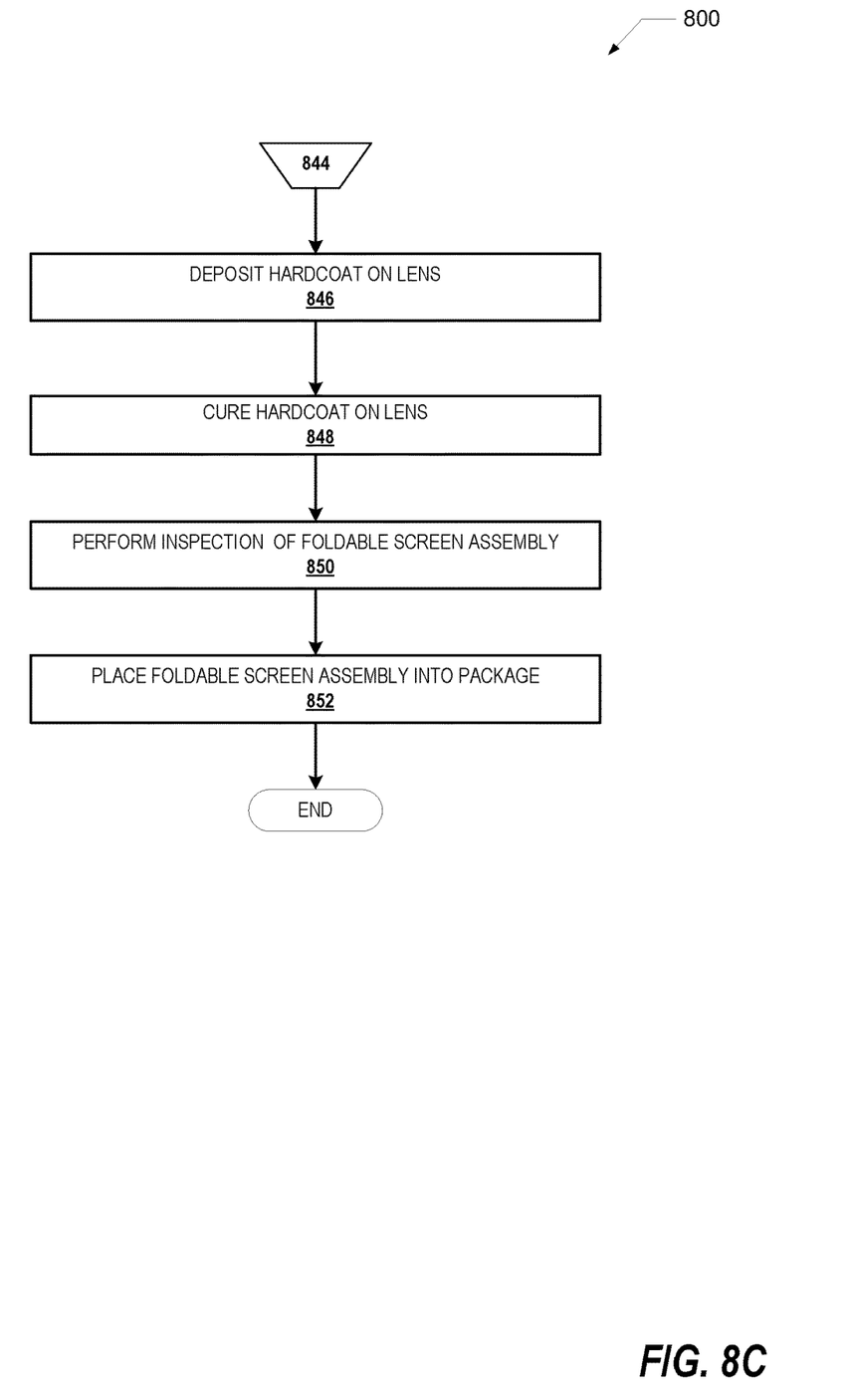

FIGS. 8A-C illustrates a flowchart of an exemplary method 800 for manufacturing a foldable screen assembly. Generally, method 800 represents a method to manufacture example foldable screen assembly 115. The description of method 800 is provided with general reference to the specific components illustrated within the preceding FIGS. 1-7.

With specific reference to FIG. 8A, method 800 begins at the start block and proceeds to block 802 where electronic display 510 is provided. At block 804, OCA 530 is deposited onto a portion of top surface 512 of electronic display 510. OCA 530 is a UV curable adhesive in which the amount of curing is proportional to the intensity and length of time that the OCA is exposed to UV light. The bottom surface 526 of the polarizer is mounted onto OCA 530 such that electronic display 510 and polarizer 522 are laminated together (block 806). At block 808, a UV mask (i.e. mask 610 or 630) is positioned over polarizer 522 and OCA 530 is selectively irradiated with UV light through the mask (block 810).

The UV mask is positioned such that the mask is juxtaposed or adjacent to the polarizer. UV light source 710 is positioned adjacent to the mask. UV light source 710 is turned on to irradiate portions of OCA 530 that are not blocked by mask 610 or 630 (i.e. at least partially cured areas 420 and 430). UV light source 710 can have a wavelength range between 320 to 400 nano-meters and can have an intensity range between 400 to 600 milli-watts per square centimeter. The UV light source can be applied for a range of times such as between 5 and 45 seconds. The at least partially cured areas 420 and 430 are at least partially cured and the at least partially uncured areas (i.e. at least partially uncured area 422) remain at least partially uncured.

Returning to the process flow, conductive adhesive 520 is deposited onto top surface 512 of the electronic display 510 in selective locations (block 812). Flexible cable 516 is mounted onto conductive adhesive 520 (block 814) such that the flexible cable is attached to the electronic display. The conductive adhesive can be allowed to cure by air drying (block 816).

At block 818, OCA 546 is deposited onto top surface 534 of touch sensor 532, and at block 820, bottom surface 544 of lens 540 is mounted onto OCA 546 such that touch sensor 532 and lens 540 are laminated together. At block 822, OCA 538 is deposited onto top surface 524 of polarizer 522, and at block 824, the combination of the touch sensor 532 and lens 540 are laminated to the combination of the electronic display 510 and the polarizer 522 via OCA 538.

Referring to FIG. 8B, at block 826, a UV mask (i.e. mask 610 or 630) is positioned over the lens, and at block 828, OCA 546 and 538 are selectively irradiated with UV light through the mask. UV light source 710 can have a wavelength range between 320 to 400 nano-meters and can have an intensity range between 400 to 600 milli-watts per square centimeter. The UV light source can be applied for a range of times such as between 5 and 45 seconds. At block 830, the combined assembly of the display, the polarizer, the lens and the touch sensor are placed into an autoclave and heat and pressure are applied in order to further laminate the layers of foldable screen assembly 115.

At block 832, OCA 556 is deposited onto the top surface 552 of cover 550. At block 834, cover 550 is mounted to bottom surface 514 of electronic display 510. OCA 566 is deposited onto bottom surface 554 of cover 550 (block 836), and top surface 562 of support plate 560 is mounted to bottom surface 554 of cover 550 via OCA 566 (block 838). At block 840, a UV mask is positioned over the combined display, lens and sensor assembly, at block 842, OCA 566 is selectively irradiated with UV light through the mask. UV light source 710 can have a wavelength range between 320 to 400 nano-meters and can have an intensity range between 400 to 600 milli-watts per square centimeter. The UV light source can be applied for a range of times such as between 5 and 45 seconds. At block 844, the combined assembly of the display, the polarizer, the lens, the touch sensor, the cover, and the support plate are placed into an autoclave, and heat and pressure are applied in order to further laminate the layers of foldable screen assembly 115.

Turning to FIG. 8C, at block 846, hard coating 548 is deposited onto top surface 542 of lens 540. Hard coating 548 is cured using UV light (block 848). An inspection of foldable screen assembly 115 is carried out at block 850, and foldable screen assembly 115 is packaged for shipping at block 852. Method 800 then ends. While method 800 is shown with one example sequence of steps or blocks 802-852 to manufacture foldable screen assembly 115, it is appreciated that some of the blocks can be omitted or the sequence of the steps can be altered or changed to manufacture foldable screen assembly 115.

While FIGS. 8A-C illustrated one sequence of operations for an exemplary method for manufacturing a foldable screen assembly, it is understood that the sequence of operations can be altered or changed to manufacture the foldable screen assembly, in one or more other embodiments.

As will be appreciated by one skilled in the art, aspects of the present invention may be embodied as a system, or method. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all functional elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A foldable screen assembly comprising:
    a planar electronic display having substantially parallel and opposed first and second surfaces;
    a planar lens assembly having a third surface that is positioned adjacent to the first surface, the planar lens assembly comprising a bendable lens;
    a first optically clear adhesive extending between the first surface of the electronic display and the third surface of the planar lens assembly, the first optically clear adhesive being an ultra violet (UV) cured adhesive, wherein a first area of the first optically clear adhesive is selectively cured using a UV light and a UV mask to provide uncured areas having a first modulus that allows the uncured areas to be flexible and a second area of the first optically clear adhesive is selectively cured to provide cured areas having a second modulus that allows the cured areas to be rigid relative to the uncured areas, the selectively cured first and second areas allowing the foldable screen assembly to bend at the first area;
    a second optically clear adhesive attached to the second surface of the electronic display, the second optically clear adhesive being a low modulus low density adhesive that cures without UV light;
    a support sheet attached to the second optically clear adhesive such that the support sheet is juxtaposed to the second surface and the second optically clear adhesive is located between the electronic display and the support sheet;
    a bendable touch sensor;
    a polarizer that is an optical filter; and
    a third optically clear adhesive located between the polarizer and the bendable touch sensor, the third optically clear adhesive being a reworkable adhesive.

2. The foldable screen assembly of claim 1, wherein the lens assembly further comprises:
    a scratch resistant hard coating covering a top surface of the lens assembly, the hard coating being a UV curable material.

3. The foldable screen assembly of claim 1, further comprising:
    a flexible connector bonded to the planar electronic display.

4. The foldable screen assembly of claim 1, wherein the first area has a first pattern of cured and uncured areas.

5. The foldable screen assembly of claim 1, wherein the first area has a gradient of cured and uncured areas.

6. The foldable screen assembly of claim 1, further comprising:
    a first and a second opposed exterior perimeter edge;
    a third and a fourth opposed exterior perimeter edge; and
    the second area having a first side and a second side, wherein the first area extends between the first edge and the first side and the first area further extends between the second edge and the second side.

7. The foldable screen assembly of claim 1, further comprising first and second opposed exterior perimeter edges and third and fourth opposed exterior perimeter edges, the second area fully extending between the first and second exterior perimeter edges.

8. The foldable screen assembly of claim 1, wherein the UV mask comprises a planar substrate upon which a pattern is formed of light blocking areas and circular light passing areas, wherein the first area of the first optically clear adhesive has a pattern of cured circular areas surrounded by uncured areas.

9. The foldable screen assembly of claim 1, wherein the UV mask comprises a planar substrate upon which a slit type pattern is formed of light blocking areas and light passing areas, wherein the first area of the first optically clear adhesive has the slit type pattern of cured and uncured sections.

10. The foldable screen assembly of claim 1, wherein the UV mask comprises a planar substrate upon which a gradient type pattern is formed having less light blocking areas on one side and gradually increasing to more light blocking areas on another side, wherein the first area of the first optically clear adhesive has the gradient type pattern.

11. The foldable screen assembly of claim 1, wherein the first modulus is less than 50 kilo-pascals and the second modulus is greater than 50 kilo-pascals.

\* \* \* \* \*